R. J. BURROWS & E. B. ROSS.
WHEEL.
APPLICATION FILED JAN. 2, 1915.
1,265,740. Patented May 14, 1918.
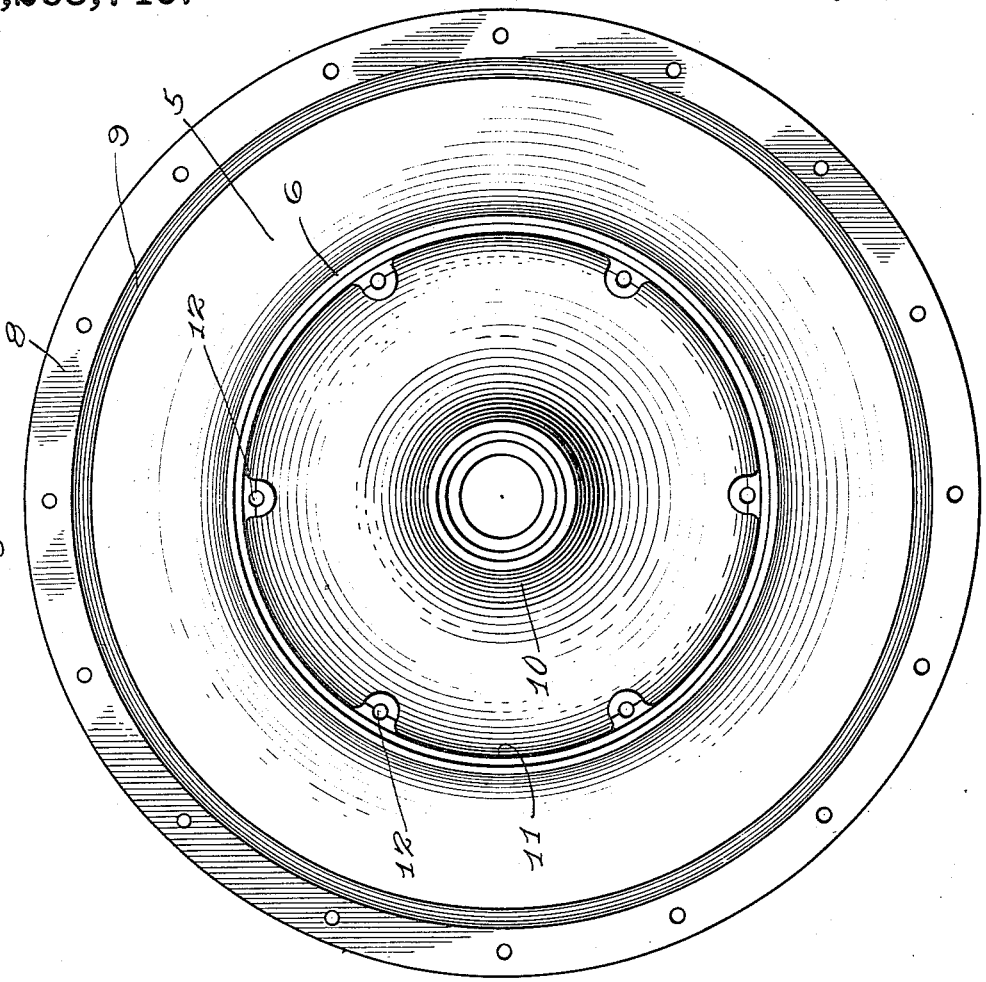
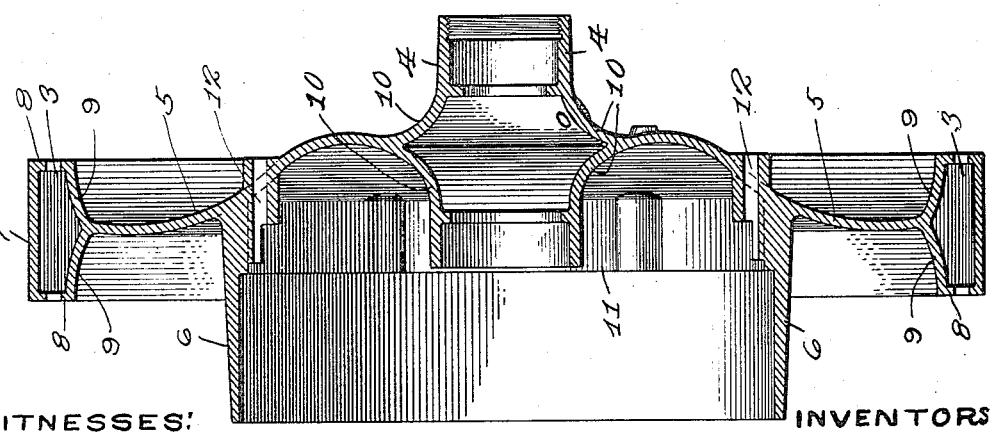
WITNESSES:
L. B. Graham
W. A. Furnner.
BY
INVENTORS
Robert J. Burrows,
Edwin B. Ross,
Adams Jackson
ATTYS.

UNITED STATES PATENT OFFICE.

ROBERT J. BURROWS AND EDWIN B. ROSS, OF BUCHANAN, MICHIGAN, ASSIGNORS, BY MESNE ASSIGNMENTS, TO CLARK EQUIPMENT COMPANY, OF BUCHANAN, MICHIGAN, A CORPORATION OF MICHIGAN.

WHEEL.

1,265,740.  Specification of Letters Patent.  Patented May 14, 1918.

Application filed January 2, 1915. Serial No. 200.

*To all whom it may concern:*

Be it known that we, ROBERT J. BURROWS and EDWIN B. ROSS, citizens of the United States, residing at Buchanan, in the county of Berrien and State of Michigan, have invented certain new and useful Improvements in Wheels, of which the following is a specification, reference being had to the accompanying drawings.

Our invention relates to metal wheels, and it has for its object to provide an improved cast metal wheel suitable for use on heavy trucks, such as automobile trucks, and which will be light but will nevertheless possess great rigidity and strength. We accomplish this object as illustrated in the drawings and as hereinafter described. That which we believe to be new is set forth in the claims.

In the accompanying drawings,—

Figure 1 is a side view of our improved wheel; and

Fig. 2 is a central vertical cross-section thereof.

Referring to the drawings,—

Our improved wheel comprises an integral cast box-like rim 3, a hub 4, a web 5 connecting the rim with the hub and a brake-drum 6 cast integral with the web 5 at one side thereof. The rim 3 consists of a substantially flat tread portion 7 adapted to receive a suitable tire, substantially radial marginal flanges 8 adjacent to the opposite side edges of the tread 7, and oppositely-curved members 9 extending from the inner marginal portions of the flanges 8 to the web 5, with which they are cast integral, as shown in Fig. 2. As also shown in said figure, the inner portion of the web 5 is joined to the hub 4 by curved members 10. The brake-drum 6 is arranged concentrically with the hub 4 and is cast integral with the web 5, preferably about midway between the hub and the rim. Near the web 5 the brake-drum 6 is thickened to form a circumferential shoulder 11, in which thickened portion are provided passages 12 for the bolts by which gearing or other parts may be secured to the wheel.

It will be noted that the several parts of the wheel form a unit, since they are cast integral with each other, and consequently there are no parts which can work loose. The box-like rim inherently possesses great strength since it practically forms a circular truss, and consequently the web 5 may be made relatively very light, since it is sustained throughout by the rim-structure. The purpose of providing the curved members 9—10 is to compensate for the shrinkage strains in the casting of the wheel and also to provide a certain elasticity between the hub and the rim which contributes to the successful casting of the wheel and to its durability in use. By casting the brake-drum 6 integral with the web 5, the web is strengthened and the difficulties of securing a separate part rigidly to it are avoided. The wheel as a whole may be made very much lighter than wooden wheels required for the same use, the difference in some cases being as much as thirty pounds, besides which our improved wheel possesses the advantage of being very much stronger and more durable.

That which we claim as our invention, and desire to secure by Letters Patent, is,—

1. A metal wheel, comprising a hub, a tire-supporting rim having a substantially flat tread portion and inwardly-directed substantially perpendicular flanges near the margins of such tread portion and integral therewith, oppositely-disposed curved members connected with the marginal portions of said flanges and extending therefrom toward and uniting with each other, forming an integral rim-structure box-like in cross-section, their convex surfaces being toward the tread, and means connecting said curved members with the hub.

2. A metal wheel, comprising a hub, a tire-supporting rim having a substantially flat tread portion and inwardly-directed substantially perpendicular flanges near the margins of such tread portion and integral therewith, oppositely-disposed curved members connected with the marginal portions of said flanges and extending therefrom toward and uniting with each other, forming an integral rim-structure box-like in cross-section, their convex surfaces being toward the tread, and a single web connecting said curved members with the hub.

3. A metal wheel, comprising a hub, a tire-supporting rim having a substantially flat tread portion and inwardly-directed substantially perpendicular flanges near the margins of such tread portion and integral therewith, oppositely-disposed curved members connected with the marginal portions of said flanges and extending therefrom toward and uniting with each other, forming an integral rim-structure box-like in cross section, their convex surfaces being toward the tread, and a continuous web connecting said curved members with the hub, said web being connected with the hub by integral oppositely-curved members.

4. A metal wheel, comprising an integral box-like rim-structure approximately rectangular in cross-section, the inner side thereof being formed by two curved members joined together at an angle, the convex surfaces of said members being toward the tread, a hub, and a web cast integral with the hub and with said curved members at their juncture.

5. A metal wheel, comprising an integral box-like rim-structure substantially rectangular in cross-section, the inner side thereof being formed by two curved members joined together at an angle, the convex surfaces of said members being toward the tread, a web cast integral with said curved members at their juncture, a hub, and two oppositely curved members integral with the hub and joined integrally together and to said web.

6. A metal wheel, comprising a hub, a tire supporting rim formed of a substantially flat tread portion, inwardly-directed substantially perpendicular flanges near the margins of said tread portion and integral therewith, and oppositely-disposed curved members connected with the marginal portions of said flanges and extending therefrom toward and integrally united with each other forming an integral rim-structure box-like in cross-section, their convex surfaces being toward the tread, a continuous web connecting said members with the hub by integral oppositely-curved members, and a brake drum carried by said web intermediately between the hub and the rim.

7. A metal wheel, comprising a hub, a tire-supporting rim having a substantially flat tread portion and inwardly-directed substantially perpendicular flanges near the margins of such tread portion and integral therewith, oppositely-disposed curved members connected with the marginal portions of said flanges and extending therefrom toward and integrally united with each other, forming an integral rim-structure box-like in cross-section, their convex surfaces being toward the tread, a web connecting said curved members with the hub, and a brake-drum projecting laterally from and cast integral with said web.

ROBERT J. BURROWS.
EDWIN B. ROSS.

Witnesses:
M. W. HANLIN,
K. E. WEHRLY.